United States Patent [19]
Taghezout

[11] Patent Number: 5,280,226
[45] Date of Patent: Jan. 18, 1994

[54] METHOD AND DEVICE FOR CONTROLLING A STEPPING MOTOR BY INTERRUPTING ITS DRIVE PULSE

[75] Inventor: Daho Taghezout, Lausanne, Switzerland

[73] Assignee: Eta SA Fabriques d'Ebauches, Granges, Switzerland

[21] Appl. No.: 786,555

[22] Filed: Nov. 1, 1991

[30] Foreign Application Priority Data

Nov. 7, 1990 [FR] France ................... 90 13893

[51] Int. Cl.[5] ................................. G04F 5/10
[52] U.S. Cl. ........................ 318/685; 318/805;
368/157; 368/160
[58] Field of Search ............... 368/157, 160; 318/685, 318/805

[56] References Cited

U.S. PATENT DOCUMENTS

| | | | |
|---|---|---|---|
| 4,439,717 | 3/1984 | Berney | 318/696 |
| 4,446,413 | 5/1984 | Remus et al. | 318/696 |
| 4,507,599 | 3/1985 | Gueria | 318/696 |
| 4,568,867 | 2/1986 | Remus et al. | 318/696 |
| 4,715,725 | 12/1987 | Kawamura et al. | 368/157 |
| 4,772,840 | 9/1988 | Taghezout | 318/696 |

FOREIGN PATENT DOCUMENTS

| | | |
|---|---|---|
| 0057663 | 8/1982 | European Pat. Off. |
| 0137093 | 4/1985 | European Pat. Off. |
| 0253153 | 1/1988 | European Pat. Off. |

OTHER PUBLICATIONS

French Search Report Jul. 1991.

*Primary Examiner*—William M. Shoop, Jr.
*Assistant Examiner*—Brian Sircus
*Attorney, Agent, or Firm*—Pollock, Vande Sande & Priddy

[57] ABSTRACT

A method and device for controlling a stepping motor having a coil and a rotor with a permanent magnet magnetically coupled to the coil. A drive pulse is applied to the coil each time the rotor has to turn by one step, and a representation of the quantity of mechanical energy supplied by the motor is measured during this drive pulse. The instant when the representation of the mechanical energy passes through its maximum value is detected, and the drive pulse is interrupted at this instant. The method and device increase the operating reliability of the stepping motor.

10 Claims, 4 Drawing Sheets

METHOD AND DEVICE FOR CONTROLLING A STEPPING MOTOR BY INTERRUPTING ITS DRIVE PULSE

BACKGROUND OF THE INVENTION

The present invention concerns a method of controlling a stepping motor having a coil and a rotor which comprises a permanent magnet magnetically coupled to the coil each time the rotor has to turn by one step and measuring the quantity of mechanical energy supplied by the motor during the drive pulse.

The invention also concerns a device for carrying out this method.

Most stepping motors being used in small devices such as timepieces are controlled by drive pulses of a fixed duration which is sufficiently long for the rotor of these motors to turn by one step in response to each such pulse, even if the resisting torque applied to the rotor is equal to the maximum torque the motor can produce.

Controlling stepping motors in this way is very simple and implementation of the method does not require complicated means.

But when a stepping motor is controlled in this way, it consumes a large quantity of electrical energy because during the vast majority of drive pulses the resisting torque applied to its rotor is much smaller than the maximum torque it can produce.

Furthermore, the operating reliability of a stepping motor controlled in this simple manner is not very high, because the drive pulses it receives may in some instances produce a rotation of the rotor by more than one step or even cause the rotor to move back to its initial position.

To increase the useful life of the batteries supplying the electrical energy required for operation of the aforementioned devices, numerous methods have been proposed for reducing the quantity of electrical energy consumed by these motors by indirectly measuring, during each drive pulse, the resisting torque applied to their rotor and interrupting the drive pulse as a function of this measurement.

Thus, for example, U.S. Pat. No. 4772840 describes such a method of controlling a stepping motor. According to this method, the mechanical energy supplied by this motor is measured during each drive pulse, as well as the time taken by this mechanical energy to reach a reference value, which time depends on the resisting torque applied to the motor's rotor during the drive pulse.

The optimum duration of the drive pulse is determined as a function of the measured time, and the drive pulse is interrupted at the end of this optimum duration.

This method theoretically enables the quantity of electrical energy consumed by a stepping motor to be reduced to the smallest possible value, whatever may be the resisting torque applied to the motor's rotor.

This method however has the drawback that the relationship between the time taken for the mechanical energy supplied by the motor during a drive pulse to reach the reference value and the optimal duration of this drive pulse depends on the electrical and magnetic characteristics of the motor.

This relationship must thus be determined experimentally for each type of motor, which is a long and expensive operation.

It is also known that a stepping motor's rotor is submitted to a positioning torque tending to hold it in or to return it to either of its rest or stable equilibrium positions, and that during each rotation it makes in response to a drive pulse, the rotor passes through an unstable equilibrium position situated substantially halfway between the stable equilibrium position it has just moved from and the one it should move to.

But, when a stepping motor is controlled according to the aforementioned method, at the end of a drive pulse its rotor has moved through only about a third of the angular distance separating its initial rest position, that it has just left, from its final rest position, i.e. the position it should reach. The rotor has thus not yet reached its unstable equilibrium position situated between these two rest positions, and the positioning torque applied thereto opposes its rotation and tends to return it to its initial position.

Normally, the kinetic energy of the rotor at the end of a drive pulse is sufficient to overcome this positioning torque and bring the rotor at least to its aforementioned unstable equilibrium position where the positioning torque cancels out, changes direction and causes the rotor to rotate to its final rest position.

But if the resisting torque applied to the rotor increases abruptly, due to a shock for example just after the end of the drive pulse, there is a high risk that the rotor's kinetic energy will be insufficient to bring it to its unstable equilibrium position, and that the rotor thus returns to its initial rest position.

Moreover, the characteristics of various components of the devices for controlling these motors in carrying out this method may also differ from one device to another, or may vary as a function of time and/or of various factors which influence these devices.

These variations may cause the rotor of a motor controlled according to the aforementioned method to turn incorrectly in response to a drive pulse, even if the resisting torque applied to the rotor during and/or after the drive pulse is less than the maximum torque the motor can produce.

It can be seen that the operating reliability of a motor controlled according to the aforementioned method is not as high as could be hoped for.

To improve this operating reliability, the control devices for implementing this method must be provided with a circuit able to detect the eventual non-rotation of the rotor which is connected therewith and, following such detection, to apply to the motor so-called catch-up pulses during which the electrical energy supplied thereto is at least equal to the energy it needs to bring its output torque to its maximum value.

These catch-up pulses however have the drawback that they may in certain cases cause the motor's rotor to rotate by more than one step, or even make the rotor go back to its starting position. In such cases, the motor's reliability is obviously not improved.

Furthermore, considerable progress has been made in the design and manufacture of stepping motors, their electronic control circuits and the sources, batteries or accumulators, that supply the requisite electrical energy to operate these motors and circuits. As a result, it is nowadays not so critical as in the past to reduce as far as possible the consumption of the stepping motors used in devices of very reduced dimensions such as electronic wrist watches.

SUMMARY OF THE INVENTION

An object of the present invention is thus to provide a method and device of controlling a stepping motor which substantially increases the operating reliability of the motor with respect to the operating reliability of a motor controlled according to one of the known methods, and wherein the motor does not consume much more electrical energy than when it is controlled according to the method described in the above-mentioned U.S. Pat. No. 4772840.

To achieve this, the method according to the present invention comprises the steps of applying to the motor's coil a drive pulse each time its rotor has to turn by one step, measuring a representation of the quantity of mechanical energy supplied by the motor during this drive pulse, detecting, during each drive pulse, the instant when the representation of the quantity of mechanical energy supplied by the motor passes through a maximum value, and interrupting the drive pulse at this instant.

Another object of the present invention is to propose a device for controlling a stepping motor, comprising means for applying a drive pulse to the motor's coil each time the rotor has to turn by one step and means for measuring the quantity of mechanical energy supplied by the motor during the drive pulse, whereby the operating reliability of the motor is much greater than when the motor is controlled by one of the known devices, and whereby the motor does not consume much more electrical energy than when it is controlled according to the above-mentioned U.S. Pat. No. 4772840.

To achieve this, the device according to the present invention further comprises means for detecting, during each drive pulse, when said quantity of mechanical energy passes through a maximum value, and means for interrupting the drive pulse in response to this detection.

BRIEF DESCRIPTION OF THE DRAWINGS

The present invention, as well as further objects and advantages thereof, will be better understood from the following description made with reference to the accompanying drawings, in which.

DETAILED DESCRIPTION

Figure 1:
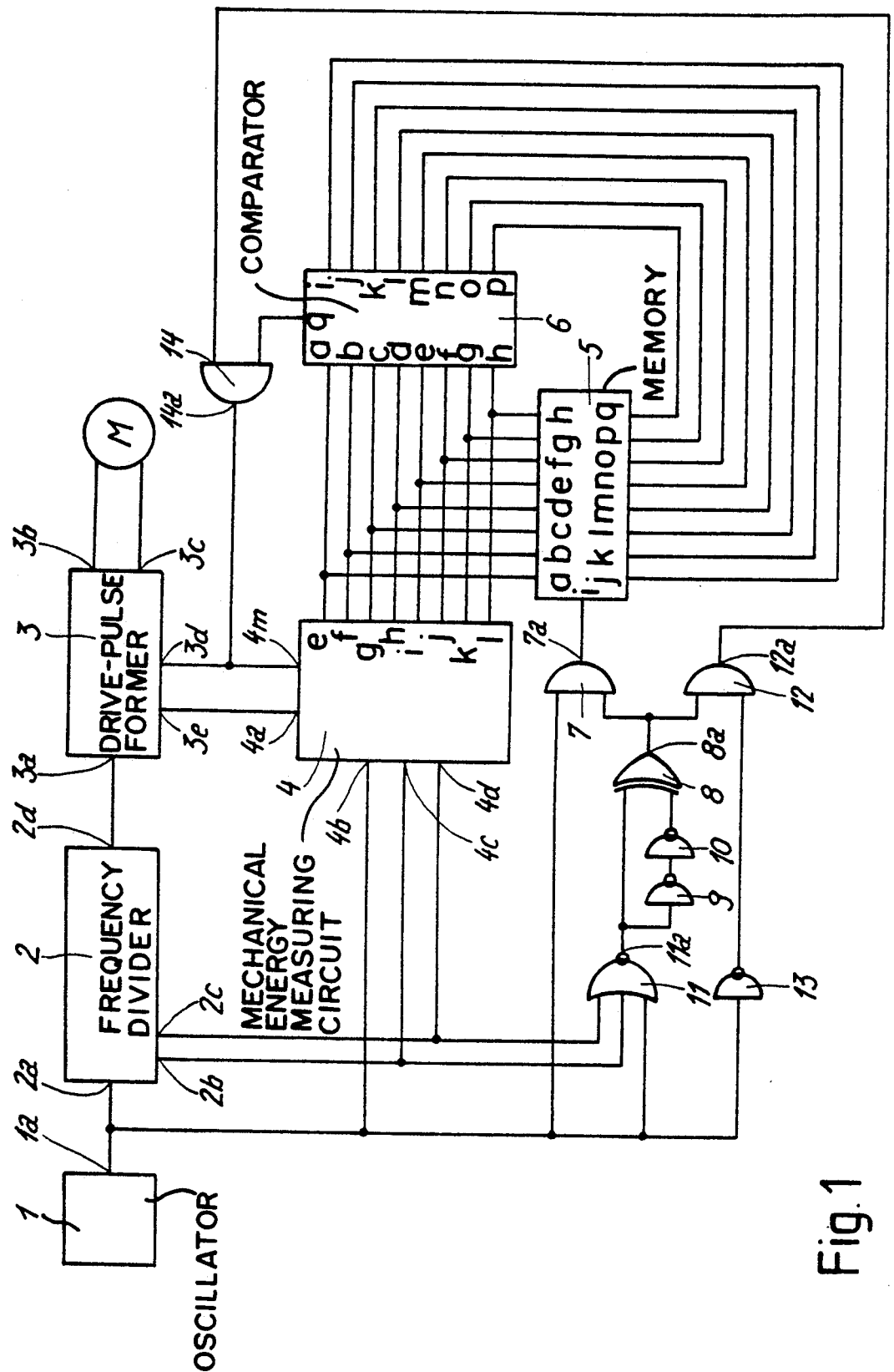
FIG. 1 schematically shows an embodiment of the device according to the invention.

The device according to the invention schematically shown in FIG. 1 by way of non-limiting example is designed to control the stepping motor of an electronic timepiece.

This motor, which is also schematically shown in FIG. 1 where it is designated by reference M, will not be described in detail because it may be any one of the various well-known types of motors that are used in particular in electronic timepieces.

It will simply be mentioned that these motors include a rotor which comprises a permanent magnet, usually bipolar but possibly also multipolar, and at least one coil magnetically coupled to this permanent magnet. These motors also comprise means, which may be of various types, for applying to their rotor a positioning torque, i.e. a torque tending to hold the rotor in or to return it to either one or another of a given number of rest positions.

The device of FIG. 1 comprises in conventional manner an oscillator 1 whose output $1a$ is connected to the input $2a$ of a frequency-divider circuit 2. The oscillator 1 and divider circuit 2 will also not be described in detail because they may be any one of various types of oscillators and divider circuits well known to specialists.

It will simply be mentioned that the output $1a$ of oscillator 1 delivers a periodic logic signal, i.e. a signal which is in a low state during one part of the period, for instance one half, and in a high state during the remainder of the period. This logic signal, which will be referred to as signal $1a$ in the rest of this specification, has for example a frequency of 32768 Hz. as in most electronic timepieces available today.

The divider circuit 2 has three outputs $2b$, $2c$ and $2d$ which each deliver a periodic logic signal. These signals, which will hereinafter be referred to as signals $2b$, $2c$ and $2d$ respectively, have frequencies of 16384 Hz, 8192 Hz and 1 Hz.

Signal $2d$ is applied to the input $3a$ of a drive-pulse forming circuit 3 having two outputs $3b$ and $3c$ each connected to one of the terminals of the coil of motor M. This coil has not been shown separately in FIG. 1.

This forming circuit 3 will not be described in detail here because its design is available to the person skilled in the art and depends, inter alia, on the nature of the drive pulses it must supply to motor M. It is known that, in some instances, a stepping motor such as motor M must be controlled by so-called "constant voltage" drive pulses, i.e. during which the motor's coil is permanently connected to a source supplying at constant voltage the electrical energy required for its operation.

It is also known that, in other instances, such a stepping motor must be controlled by so-called "chopped" pulses, i.e. during which its coil is alternately connected to and disconnected from the source.

It is furthermore known that, in still other instances, such a stepping motor must be controlled by so-called "constant current" drive pulses during which the current through its coil is maintained at an approximately constant value.

In still further instances the stepping motor is controlled by drive pulses of one of the above-mentioned types during one part of their duration and of another type during the remainder of their duration.

In all of these instances, the drive pulses have alternating polarities, i.e. each drive pulse has a polarity opposite to that of the preceding one and of the following one.

Whatever type of drive pulse must be supplied to motor M, the forming circuit 3 is arranged such that it begins to produce a drive pulse each time the signal $2d$ goes from low to high, i.e. once per second in this example.

The forming circuit 3 includes one input $3d$ and is further arranged so as to interrupt each drive pulse in response to transition from low to high of an interruption signal applied to input $3d$ by a circuit to be described later. Lastly, the forming circuit 3 has an output $3e$ that delivers a signal the nature and purpose of which will be described later.

The device of FIG. 1 further includes a circuit for measuring the mechanical energy supplied by the motor M during each drive pulse applied thereto by forming circuit 3.

This measuring circuit 4 will not be described in detail here because it can be made in various ways by persons skilled in the art on the basis of the following well-known equation:

$$Em(t) = \int_0^t u(t) \cdot i(t)dt - \int_0^t R[i(t)]^2 dt - 0.5L[i(t)]^2$$

in which,

Em(t) is the mechanical energy supplied by the motor M from the beginning of a drive pulse up to time t, u(t) is the voltage applied to the coil of motor M, i(t) is the current flowing in the coil, and R and L are respectively the resistance and the inductance of the coil.

To take a concrete example, we will suppose that the measuring circuit 4 of the device of FIG. 1 is similar to that described in U.S. Pat. No. 4772840 and which is made up of the components designated by references 8 and 10 to 15 in FIG. 1 of said patent.

This circuit will not be described again here. However, it should be noted that it is adapted to the specific case where the pulse forming circuit of the device. i.e. circuit 3 of FIG. 1, is similar to the one also described in U.S. Pat. No. 4772840 and which is made up of the components designated by references 1, 5 to 7 and 9 in FIG. 1 of said patent.

As is clear from the specification of U.S. Pat. No. 4772840, this forming circuit is so arranged that during each drive pulse it applies to the motor to which it is connected, the latter's coil is alternately connected to a supply source and short-circuited according to whether the current flowing in the coil is less than or greater than a reference current. The current flowing in the coil is thus substantially constant during the greater part of each drive pulse. Moreover, the forming circuit has an output, namely the output Q of its flip-flop 9, that delivers a logic signal having the low state when the motor coil connected to this circuit is short-circuited, and the high state when the coil is connected to the device's supply source.

This signal is the one delivered by output 3e of the forming circuit 3 of the present device.

Like the measuring circuit described in U.S. Pat. No. 4772840, measuring circuit 4 has one input, designated by reference 4a, which is connected to the output 3e of forming circuit 3 and receives the just-described signal. Additionally, circuit 4 includes three inputs, designated by references 4b, 4c and 4d, which receive periodic logic signals respectively having frequencies of 32768 Hz, 16384 Hz and 8192 Hz. In the present example, these signals are produced respectively by the output 1a of oscillator 1, and by the outputs 2b and 2c of divider 2.

The measuring circuit 4 further includes eight outputs, designated by references 4e to 4l, corresponding to outputs 8d to 8k of the counter 8 described in U.S. Pat. No. 4772840, and is arranged in a manner such that, during each drive pulse, the binary number formed by the logic states of these outputs 4e to 4l takes a new value at each instant when signal 2c goes from high to low, and such that this new value is proportional to the mechanical energy supplied by motor M from the beginning of this drive pulse. This binary number will hereinafter be referred to as number N, and each of the instants when it takes a new value will be referred to as instant $t_1$.

Lastly, circuit 4 includes an input 4m, which corresponds to the input R of flip-flop 10 in U.S. Pat. No. 4772840, and is arranged such that number N becomes equal to zero in response to each passage of input 4m from low to high. As will be seen further on, this passage of input 4m from low to high takes place at the end of each drive pulse.

The outputs 4e to 4l of measuring circuit 4 are connected to inputs 5a to 5h of a memory circuit 5 and to first inputs 6a to 6h of a binary comparator circuit 6.

The above-defined number N is thus applied permanently to the inputs 5a to 5h of memory circuit 5 and to the inputs 6a to 6h of comparator 6.

Memory circuit 5 further comprises a control input 5i and eight outputs 5j to 5q. It is arranged so that its outputs 5j to 5q respectively take the same logic state as the inputs 5a to 5h when the control input 5i is high and these outputs 5j to 5q stay in their logic state, independently of any variation of the logic state of inputs 5a to 5h, when the control input 5i is low. In other words, each time the input 5i of circuit 5 passes from low to high, the binary number formed by the logic states of its inputs 5a to 5h, which is the number N, is transferred to its outputs 5j to 5q.

The memory circuit 5 is of the well known "latch" type, and will not be described in detail.

Outputs 5j to 5q of memory circuit 5 are respectively connected to second inputs 6i to 6p of the numeric comparator circuit 6 which further includes an output 6q.

The comparator circuit 6 will also not be described in detail here because it is well known to skilled persons. It is noted, however, that in this particular instance its output 6q is only high if the binary number represented by the logic states of its first inputs 6a to 6h is smaller than the binary number represented by the logic states of its second inputs 6i to 6p.

The device of FIG. 1 further comprises an AND gate 7 whose output 7a is connected to the control input 5i of memory circuit 5. The two inputs of gate 7 are respectively connected to the output 1a of oscillator 1 and to output 8a of an exclusive OR gate 8.

The inputs of gate 8 are connected, one directly and the other via two inverters 9 and 10, to the output 11a of a NOR gate 11 whose inputs are respectively connected to the output 1a of oscillator 1 and to the outputs 2b and 2c of divider circuit 2.

Output 8a of gate 8 is also connected to one input of an AND gate 12 whose other input is connected to the output 1a of oscillator 1 via an inverter 13.

Lastly, output 12a of gate 12 is connected to one input of an AND gate 14 whose other input is connected to output 6q of comparator 6 and whose output 14a is connected to input 3d of forming circuit 3 and to input 4m of measuring circuit 4.

Operation of the device of FIG. 1 will be described hereinafter with reference to FIG. 2.

Figure 2:
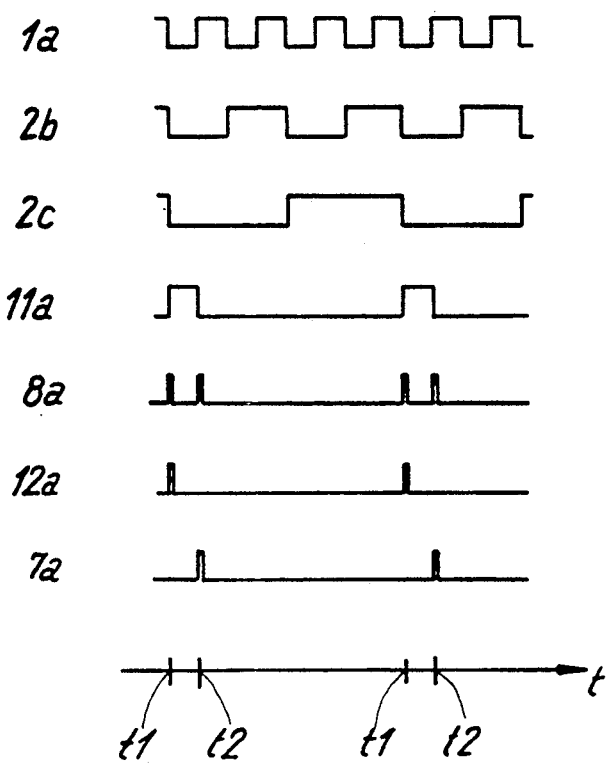
FIG. 2 is a diagram showing signals measured at different points of the diagram of FIG. 1.

In FIG. 2, each diagram is designated by the same reference as the point of FIG. 1 where the signal represented by the diagram is measured.

Moreover, each signal will hereinafter be designated by the reference of the point of FIG. 1 where the signal is measured.

It can readily be seen that signals 12a and 7a are periodic logic signals having the same period as signal 2c, and that these signals 12a and 7a are formed of very short pulses during which they are high, separated by intervals during which these signals 12a and 7a are low. The pulses of signal 12a are produced each time signal 2c goes from high to low, i.e. at each of the above-defined instants $t_1$, whereas each pulse of signal 7a is produced one half of a period of signal 1a later, namely about 15 microseconds after each pulse of signal 12a. The instants when the pulses of signal 7a are produced will hereinafter be called instants $t_2$.

As mentioned before, the number N present at the outputs 4e to 4l of measuring circuit 4 is equal to zero between two successive drive pulses applied to motor M by forming circuit 3. The same is therefore true for the binary number present at outputs 5j to 5q of memory circuit 5 because, at each instant t2, this number N is transferred to these outputs.

Still between two drive pulses, the output 6q of comparator 6 remains low because the respective binary numbers present at its first and second inputs are both equal to zero. Consequently, the output 14a of gate 14 is also low.

When signal 2d goes from low to high, the forming circuit 3 begins to apply a drive pulse of appropriate shape to motor M. After a short delay, the motor M's rotor begins to turn in response to the drive pulse and thus to supply mechanical energy to the mechanical device connected thereto.

From the very instant when the rotor begins to turn, number N takes a new value, greater than zero, at each instant $t_1$.

The designations $t_{1i}$ and $t_{1j}$ will be used to identify two consecutive instants $t_1$; $t_{2i}$ and $t_{2j}$ the instants $t_2$ situated immediately after instants $t_{1i}$ and $t_{1j}$ respectively; and $N_i$ and $N_j$ the values taken by number N at instants $t_{1i}$ and $t_{1j}$ respectively. It can readily be seen that at instant $t_{1j}$ number $N_j$ is applied to the first inputs 6a to 6h of comparator 6, whereas the number $N_i$ is still being applied to the second inputs 6i to 6p of comparator 6.

If number $N_j$ is greater than number $N_i$, i.e. if the amount of mechanical energy supplied by motor M has increased between the instants $t_{1i}$ and $t_{1j}$, the output 6q of comparator 6 remains low. The pulse of signal 12a applied at the same instant to gate 14 is thus without effect, and the output 14a of gate 14 remains low.

Next, the pulse of signal 7a applied at instant $t_{2j}$ to the control input 5i of memory circuit 5 causes the transfer of number $N_j$ to the outputs 5j to 5q of circuit 5. From this very instant, and up to the following instant $t_1$, number $N_j$ is present at the first and second inputs of comparator 6 whose output 6q thus remains low.

This process is repeated as long as, at each instant $t_{1j}$, number $N_j$ is greater than number $N_i$, i.e. as long as the quantity of mechanical energy supplied by motor M increases.

Figure 3:
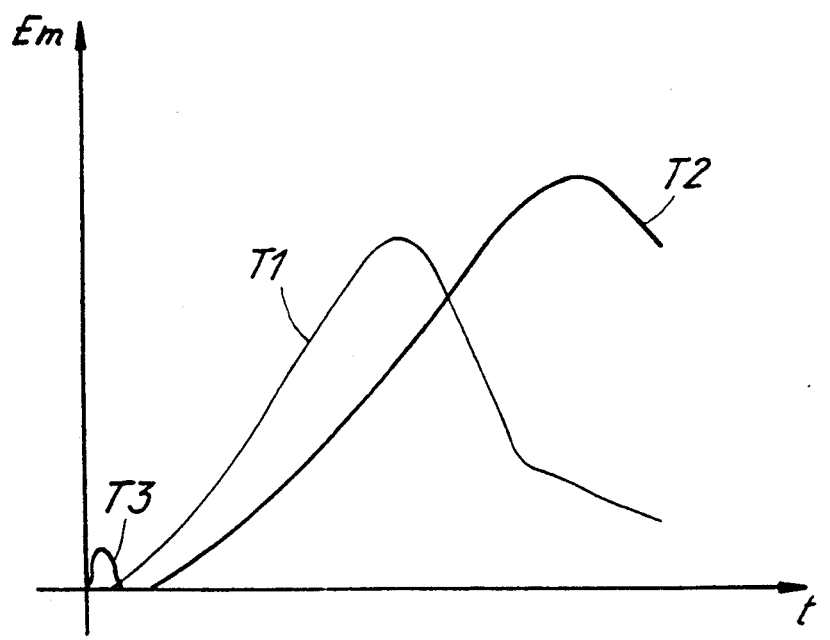
FIG. 3 is a graph showing the variation of the mechanical energy supplied by a stepping motor during a drive pulse.

As shown in FIG. 3, this mechanical energy passes, in a well know manner, through a maximum value at an instant which depends on the electrical and magnetic characteristics of motor M and on the mechanical characteristics of the load it drives.

In FIG. 3, the curves designated as T1 and T2 schematically illustrate the variation, as a function of time t, of the mechanical energy Em supplied by a motor such as motor M during a drive pulse of relatively long duration respectively for a first value and a second, greater, value of the resisting torque applied to the motor.

After having passed through this maximum, the mechanical energy decreases, provided that the drive pulse continues to be applied to motor M. At an instant $T_{1j}$ situated just after the mechanical energy has passed through its maximum value, the number $N_j$ is thus less than the number $N_i$ present at the outputs 5j to 5q of memory 5 since instant $t_{2i}$.

At this instant $t_{1j}$, output 61 of comparator 6 thus goes high because the binary number at its first inputs 6a to 6h is less than that at its second inputs 6l to 6p. The pulse of signal 12a produced at this same instant $t_{1j}$ thus causes a pulse of the same duration to appear at output 14a of gate 14, at input 3d of forming circuit 3, and at input 4m of measuring circuit 4.

This pulse thus causes interruption of the current drive pulse and the resetting to zero of number N at the outputs 4e to 4l of measuring circuit 4.

The device of FIG. 1 is thus back in the same state as before the beginning of the drive pulse, and it remains in this state until signal 2d again goes from low to high, i.e. up to the beginning of the next drive pulse, during which the above described process repeats itself.

It should be noted that the maximum value the mechanical energy supplied by the motor M reaches during a drive pulse, and the time taken for the mechanical energy to reach this maximum, depend directly on the mechanical load driven by motor M during the drive pulse. As this mechanical load is usually variable, so are said maximum value and said time.

It can be seen that the device of FIG. 1 enables adjustment of the duration of each drive pulse applied to motor M as a function of the mechanical load driven by motor M during this drive pulse, in a very reliable manner, without it being necessary to provide a circuit for detecting any possible non-rotation of the rotor upon the application of a drive pulse.

Theoretical considerations, which will not be expounded here, but which have been confirmed in practice, show that at the instant when the mechanical energy supplied by motor M passes through its maximum value, the rotor occupies an angular position situated substantially halfway between its unstable equilibrium position and the rest position it has to reach. In this angular position, the positioning torque applied to the rotor tends to move it towards its final rest position. This positioning torque which, in this position, further has a value close to its maximum, is thus added to the torque due to the kinetic energy of the rotor. As a result, the rotor is certain to complete its rotation if the drive pulse is interrupted at this instant, and there is no risk of the rotor continuing its rotation to the next rest position, or moving back to its starting position.

Operation of the device of FIG. 1 furthermore involves the comparison of two values measured successively by the same measuring circuit, and not the comparison of one measured value with a reference value supplied by a circuit separate from the measuring circuit.

This device may thus be used with any type of motor without it being necessary to previously determine a reference value adapted to this type of motor, and its operation is furthermore independent of any differences between the various components from one device to another.

It is clear that for a given mechanical load driven by a given motor to which a drive pulse at the same voltage (in the case of a constant voltage pulse) or at the same current (in the case of a constant current pulse), is applied, the duration of this drive pulse and hence the quantity of electrical energy consumed by the motor during this drive pulse are greater when it is controlled by a device such as that of FIG. 1 than when it is controlled by a device like the one which is disclosed in the aforementioned U.S. Pat. No. 4772840.

But when the consumption of the motor is considered over a long period, it is seen that this difference is not very great, due to the fact that when the motor is controlled by the device of FIG. 1, is is practically never necessary to supply it with catch-up pulses which, in a case like that described in U.S. Pat. No. 4772840, are pulses during which the motor's consumption is quite high.

It will furthermore be seen later that it is possible to reduce the consumption of electrical energy in a stepping motor controlled by a device like that of FIG. 1 practically down to that of the same motor controlled by a device such as that described in U.S. Pat. No. 4772840.

It is well known that, independently of the manner in which a stepping motor is controlled, the driving torque it supplies and the resisting torque applied to its rotor vary while the motor rotates in response to a drive pulse. If, during this rotation, the resisting torque becomes equal to or greater than the driving torque, the rotor may stop. In such a case, the mechanical energy supplied by the motor no longer varies after the rotor has stopped and thus does not pass through a maximum value.

Also, if this resisting torque is high enough while on average being less than the driving torque the rotor can supply, the rotor may turn at a relatively low speed. In such a case, the rate of increase of the mechanical energy supplied by the motor is very slow, and this mechanical energy reaches its maximum value at the end of a time which can be several tens of milliseconds, whereas in normal conditions this time is generally less than ten milliseconds.

Figure 4:
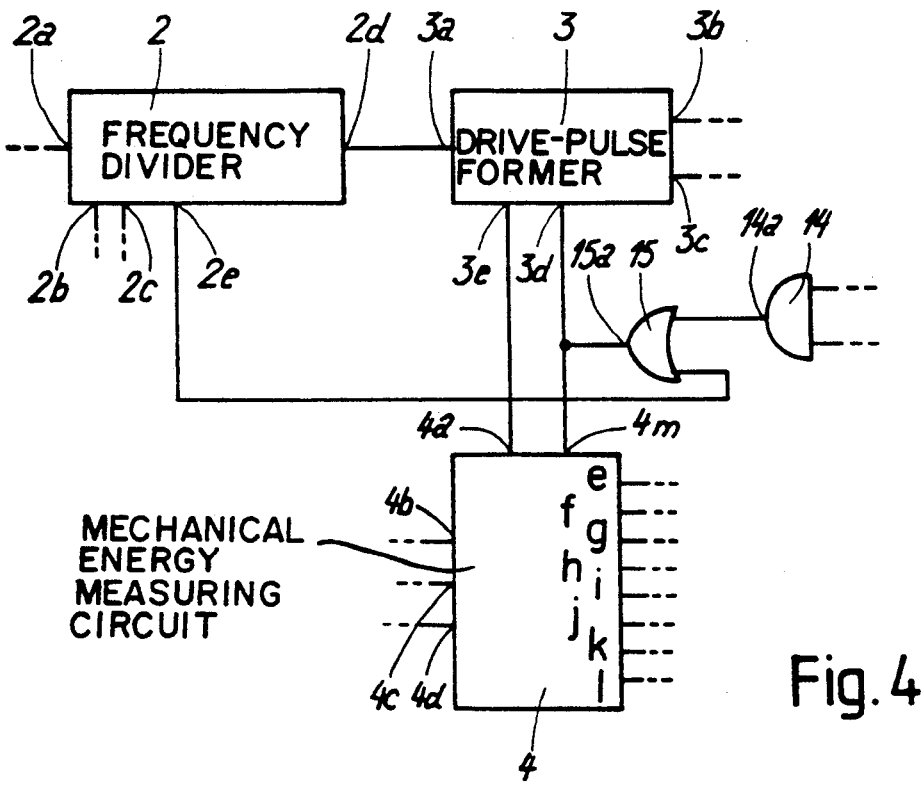
FIGS. 4, 5 and 6 schematically show parts of other embodiments of the device according to the invention.

To avoid the needless consumption of electrical energy that would occur in such a case, the device of FIG. 1 may be modified in the manner shown in FIG. 4.

In the device of FIG. 4, output 14a of gate 14 is no longer directly connected to inputs 3d and 4m of forming circuit 3 and of measuring circuit 4. An OR gate 15 has been added. Output 15a of this gate 15 is connected to the aforementioned two inputs 3d and 4m. Also, one of the inputs of gate 15 is connected to output 14a of gate 14, and the second input of gate 15 is connected to an output 2e of divider circuit 2. The remainder of the device of FIG. 1 has not been modified and has not been shown in FIG. 4.

In this example, the output 2e of divider 2 delivers a periodic logic signal at a frequency of 32 Hz. Like the other signals supplied by divider 2, signal 2e is low during one half of its period and high during the other half of the period. Also, at each instant when signal 2d goes high, i.e. at each instant when forming circuit 3 begins to apply a drive pulse to motor M, signal 2e goes from high to low. As the period of signal 2e is 31.25 milliseconds, it goes high again 15.625 milliseconds after the beginning of each drive pulse.

At this instant, the output 15a of gate 15 thus also goes high, and as a result the current drive pulse is interrupted and number N reset to zero if this has not already been done by the pulse produced by the output 14a of gate 14 in the manner described above.

In this embodiment of the device according to the invention, a drive pulse cannot last for more than about fifteen milliseconds, even if a very large resisting torque is applied to the rotor during this drive pulse.

After a drive pulse has been interrupted in the just-described manner, it is possible that the motor's rotor nevertheless finishes its step, either because the resisting torque, although high, is not on average greater than the drive torque, or because the cause of the increase of the resisting torque has disappeared. In either case, of course, the rotor must have already passed through its unstable equilibrium position at the instant when the drive pulse is interrupted.

In practice, it is however observed that the latter condition is often not fulfilled. In most cases, after the drive pulse has been interrupted in this way, the motor's rotor returns to its starting position. In such a case, the following drive pulse has the opposite polarity to that corresponding to the position of the rotor, because two successive drive pulses are always of opposite polarity.

The following drive pulse thus produces a small rotation of the rotor of motor M in a direction opposite to the desired direction. During such a rotation, the mechanical energy supplied by the motor is very small and it reaches its maximum value after a very short time, less than about two millisecondes. Furthermore, this maximum value is generally about three to ten times less than that reached by the mechanical energy when the rotor turns normally in response to a drive pulse and the resisting torque applied to the rotor is at its minimum value.

The mechanical energy supplied by the motor in such a case is represented by the curve designated by reference T3 in FIG. 3.

Figure 5:
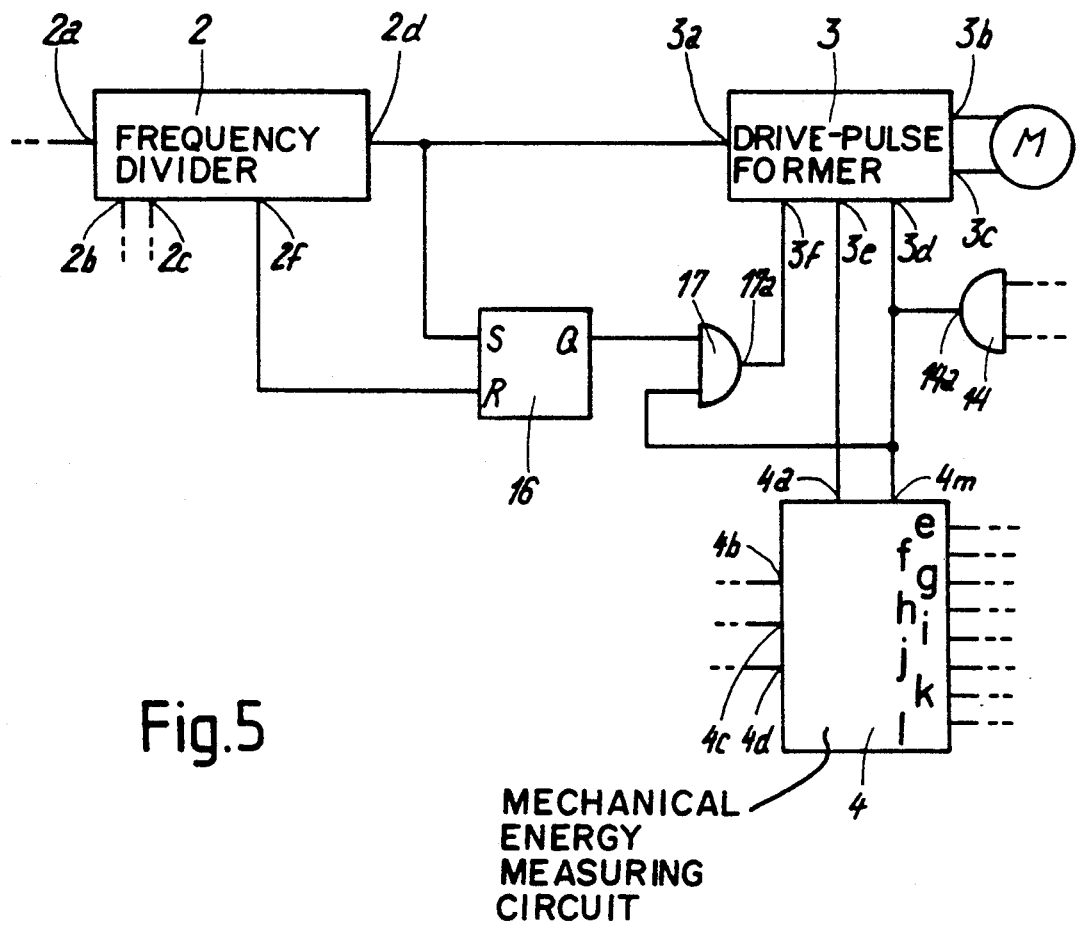
Figure 6:
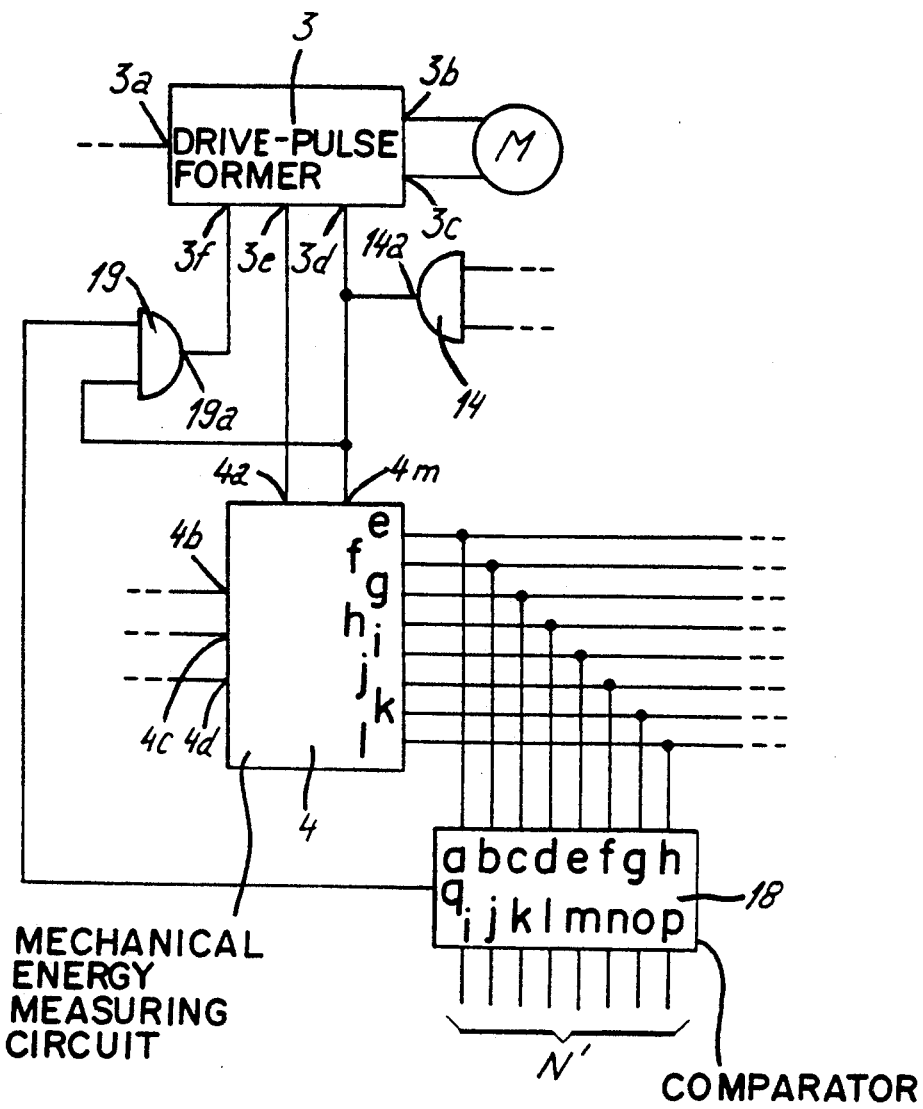

FIGS. 5 and 6 each show an example of a circuit which may be added to the device of FIG. 1 to detect such a situation.

The circuit of FIG. 5 comprises an R-S type bistable 16 whose inputs S and R are respectively connected to the output 2d of frequency divider 2 and to a supplementary output 2f of said divider 2.

The output Q of bistable 16 is connected to a first input of an AND gate 17 whose second input is connected to the output 14a of gate 14, like the inputs 3d and 4m of forming circuit 3 and measuring circuit 4, respectively.

The remainder of the device is identical to that of FIG. 1 and is not shown in FIG. 5.

In this example, the output 2f of divider 2 delivers a periodic logic signal at a frequency of 256 Hz. Like the other signals supplied by divider 2, signal 2f is low during one half of its period, namely during about two milliseconds, and high during the other half of its period. Also, at each instant when signal 2d goes high, i.e. at the beginning of each drive pulse, signal 2f goes from high to low. It then goes high again about two milliseconds after the beginning of each drive pulse.

It can readily be seen that the output Q of bistable 16 goes high at the beginning of each drive pulse, goes low again about two milliseconds later, and remains low until the beginning of the next drive pulse.

It can also readily be seen that when the rotor of motor M occupies a correct position at the beginning of a drive pulse, the pulse produced by output 14a of gate 14 at the instant when the mechanical energy supplied by motor M reaches its maximum value is blocked by gate 17 because, in this case, this pulse 14a is produced more than two milliseconds after the beginning of the drive pulse while the output Q of bistable 16 is low.

However, when the motor M's rotor does not occupy a position corresponding to the polarity of a drive pulse at the beginning thereof, the pulse produced by output 14a of gate 14 at the instant when the mechanical energy supplied by motor M passes through its maximum value is transmitted to the output 17a of gate 17 because, in this case, the output Q of bistable 16 is still high at this instant. This pulse, appearing in this instance at output 17a of gate 17, thus constitutes a detection signal indicating that the rotor of motor M does not occupy the position corresponding to the polarity of the drive pulse being applied. The circuit of FIG. 6 comprises a second numeric comparator designated by reference 18, having first inputs 18a to 18h connected respectively to outputs 4e to 4l of measuring circuit 4 and hence receiving the above-defined binary number N.

The second inputs of comparator 18, designated by references 18i to 18p, permanently receive another binary number N' formed by the low or high states of these inputs.

Number N' is a fixed number chosen in such a manner as to be, on the one hand, less than the maximum value reached by the number N during a drive pulse when the rotor of motor M has, at the beginning of this drive pulse, an angular position corresponding to the polarity thereof and the resisting torque applied to the rotor is at its minimum value and, on the other hand, greater than the maximum value reached by the number N when, at the beginning of a drive pulse, the rotor is not in a position corresponding to the polarity thereof.

As the first above-mentioned maximum value is three to ten times greater than the second, it is always possible to find a number N' that satisfies these two conditions.

Comparator 18 further comprises an output 18q, and is arranged in such a manner that output 18q is high when number N is less than or equal to number N', and low when number N is greater than number N'.

Output 18q is connected to a first input of an AND gate 19 whose second input is connected to output 14a of gate 14. Output 19a of gate 19 is connected to the input 3f of forming circuit 3, which is identical to forming circuit 3 of FIG. 5

The remainder of the device is identical to that of FIG. 1 and is not shown in FIG. 6.

It can readily be seen that if, at the beginning of a drive pulse, the motor M's rotor is in a position that corresponds to the polarity of this pulse, the number N reaches and exceeds the value of number N' before reaching its maximum value.

In this case, output 18q of comparator 18 is low when the output 14a of gate 14 delivers, in the above-described manner, a pulse indicating that the mechanical energy supplied by motor M has reached its maximum. This pulse is thus blocked by gate 19.

However, when motor M's rotor is not in a position that corresponds to the polarity of a drive pulse at the beginning thereof, the number N is still less than number N' at the instant when it passes through its maximum value. Output 18q of comparator 18 is thus still high at this moment, and the pulse produced by the output 14a of gate 14 is transmitted to output 19a of gate 19. This pulse appearing at output 19a of gate 19 thus also forms a detection signal indicating that the motor M's rotor does not occupy a position that corresponds to the polarity of the drive pulse being applied. This signal is thus equivalent to that supplied, in the above-described manner, by the circuit of FIG. 5.

Independently of the circuit used to generate it, this detection signal may for example be used by the forming circuit 3, which must of course be arranged in a suitable way, to supply to the motor M one or more supplementary drive pulses, called catch-up pulses, intended to bring the motor M's rotor into the correct position. Such a case has been shown in FIGS. 5 and 6, where output 17a of gate 17 and output 19a of gate 19, respectively, are connected to a supplementary input 3f of forming circuit 3.

Such a drive pulse forming circuit will not be described in detail here because its configuration depends on the intended use of the detection signal supplied by output 17a of gate 17 or output 19a of gate 19, and because it can easily be designed by persons skilled in the art. An example of such a circuit is described in U.S. Pat. No. 4507599.

It should be noted that, during the above-mentioned catch-up pulses, the mechanical energy supplied by the motor may very well be measured, and these catch-up pulses may also be interrupted at the instant when this mechanical energy passes through its maximum value or after a predetermined duration thereof, as was described above for the normal drive pulses.

It should also be noted that the use of a detector circuit such as that of FIG. 5 or FIG. 6 enables the forming circuit 3 to be designed in such a manner that it can vary the voltage applied to the motor M's coil, or the current flowing in this coil, as a function of the production or the non-production of the hereinabove described detection signal.

Thus, for example, the forming circuit 3 may be designed so as to progressively and periodically reduce the voltage it applies to the coil of motor M, or the current it causes to flow in this coil, down to a predetermined minimum value or until the detector circuit produces a signal indicating that the motor has malfunctioned in response to a drive pulse.

The forming circuit 3 may thus, still by way of example, supply to the coil of motor M a catch-up pulse during which the voltage applied to this coil, or the current flowing therein, has a very high, predetermined value, and then begin again to reduce this voltage or current.

In this manner, the electrical energy consumption of motor M can be reduced to a value practically equal to the consumption of the same motor driving the same mechanical load when the motor is controlled in the manner described in the aforementioned U.S. Pat. No. 4772840.

What is claimed is:

1. A method of controlling a stepping motor having a coil and a rotor which comprises a permanent magnet magnetically coupled to the coil, said method comprising the steps of applying to the coil, each time the rotor has to turn by one step, a drive pulse during which electrical energy is supplied to the coil, measuring during said drive pulse the portion of said electrical energy which is converted into mechanical energy by the motor, detecting the instant when said portion of said electrical energy passes through a maximum value, and interrupting said drive pulse at said instant, the portion of said electrical energy converted into mechanical energy by the motor being determined in accordance with the following equation:

$$Em(t) = \int_0^t u(t) \cdot i(t)dt - \int_0^t R\{i(t)\}^2 dt - 0.5L\{i(t)\}^2$$

in which,
Em(t) is said portion of said electrical energy converted into mechanical energy by the motor from the beginning of said drive pulse up to time t,
u(t) is the voltage applied to the coil of the motor,
i(t) is the current flowing in the coil, and
R and L are respectively the resistance and the inductance of the coil.

2. A method according to claim 1, wherein the detecting step comprises the steps of determining a plurality of first instants separated from each other by a first predetermined time period and a plurality or second instants separated from each other by said first predetermined time period but distinct from said first instants, memorizing the value of said portion of said electrical energy at each of said second instants, and comparing the value of said portion of said electrical energy at each of said first instants with the value of said portion of said electrical energy memorized at the immediately preceding second instant to determine when said portion of said electrical energy passes through said maximum value.

3. A method according to claim 1, further comprising the step of interrupting the drive pulse when said portion of said electrical energy has not reached a maximum value at an instant separated from the beginning of the drive pulse by a predetermined time period.

4. A device for controlling a stepping motor having a coil and a rotor comprising a permanent magnet magnetically coupled to the coil, said device comprising means for applying to the coil, each time the rotor has to turn by one step, a drive pulse during which electrical energy is supplied to the coil, means for measuring during said drive pulse the portion of said electrical energy which is converted into mechanical energy by the motor, detecting means for producing a detection signal at the instant when said portion of said electrical energy passes through a maximum value, and means responsive to said detection signal for interrupting said drive pulse at said instant, the portion of said electrical energy converted into mechanical energy by the motor being determined in accordance with the following equation:

$$Em(t) = \int_0^t u(t) \cdot i(t)dt - \int_0^t R\{i(t)\}^2 dt - 0.5L\{i(t)\}^2$$

in which,
Em(t) is said portion of said electrical energy converted into mechanical energy by the motor from the beginning of said drive pulse up to time t,
u(t) is the voltage applied to the coil of the motor,
i(t) is the current flowing in the coil, and
R and L are respectively the resistance and the inductance of the coil.

5. A device according to claim 4, wherein said detecting means comprising means for determining a plurality of first instants separated from each other by a first predetermined time period and a plurality of second instants separated from each other by said first predetermined time period but distinct from said first instants, means for memorizing the value of said portion of said electrical energy at each of said plurality of second instants, and means for comparing the value of said portion of said electrical energy at each of said plurality of first instants with the value of said portion of said electrical energy memorized at the immediately preceding second instant to determine when said portion of said electrical energy passes through said maximum value.

6. A device according to claim 4, further comprising means for producing a safety signal when said portion of said electrical energy has not reached a maximum value at an instant separated from the beginning of said drive pulse by a predetermined time period, and wherein said means for interrupting the drive pulse is arranged so as to interrupt said drive pulse in response to said safety signal.

7. A method according to claim 1, further comprising the step of producing a detection signal when said portion of said electrical energy passes through said maximum value before an instant separated from the beginning of said drive pulse by a predetermined time period.

8. A method according to claim 1, further comprising the step of producing a detection signal when said maximum value is smaller than a predetermined value.

9. A device according to claim 4, further comprising means for producing a detection signal when said portion of said electrical energy passes through said maximum value before an instant separated from the beginning of said drive pulse by a predetermined time period.

10. A device according to claim 4, further comprising means for producing a detection signal when said maximum value is smaller than a predetermined value.

* * * * *